(12) United States Patent
Hernandez et al.

(10) Patent No.: US 6,542,601 B1
(45) Date of Patent: *Apr. 1, 2003

(54) METHOD AND SYSTEM FOR AUTOMATED CUSTOMER SUPPORT SERVICES

(76) Inventors: David Hernandez, 7908 Kettlewood Ct., Plano, TX (US) 75025; Kamran Mir, 7609 England Dr., Plano, TX (US) 75025

(*) Notice: Subject to any disclaimer, the term of this patent is extended or adjusted under 35 U.S.C. 154(b) by 0 days.

This patent is subject to a terminal disclaimer.

(21) Appl. No.: 09/293,666

(22) Filed: Apr. 16, 1999

Related U.S. Application Data

(60) Provisional application No. 60/082,169, filed on Apr. 17, 1998.

(51) Int. Cl.[7] ............................................. H04M 3/00
(52) U.S. Cl. .............................. 379/265.01; 379/91.01; 379/93.03
(58) Field of Search ....................... 379/265.01, 266.01, 379/309, 91.01, 93.03, 113, 114

(56) References Cited

U.S. PATENT DOCUMENTS 5,987,118 A  * 11/1999  Dickerman et al. .. 379/91.01 X

* cited by examiner

*Primary Examiner*—Creighton Smith

(57) ABSTRACT

A system and method for accepting customer calls for product related services and directing these calls to an appropriate customer care center. The system contains a customer support network and a customer transaction database for storing a plurality of product information and vendor/customer data. A transaction processor is arranged to process calls routed through the network and determine the appropriate call center for a particular customer from the entry of a customer personal identification number provided to the customer. The number accompanies a telephone access number. Both numbers may be imprinted on a support card.

47 Claims, 6 Drawing Sheets

METHOD AND SYSTEM FOR AUTOMATED CUSTOMER SUPPORT SERVICES

CROSS REFERENCE TO RELATED APPLICATIONS

This application claims benefit of U.S. Provisional Application Ser. No. 60/082,169, filed Apr. 17, 1998, the contents of which are hereby incorporated by reference.

BACKGROUND OF THE INVENTION

1. Field of the Invention

The present invention relates to a system and method for providing customer support services using a network based database, and more specifically, to an application that collects and stores customer, vendor and product data, accepts service calls from customers, and routes the calls to appropriate customer care centers. Access to the network is further controlled by a PIN and access number imparted to a customer via a credit/debit type card.

2. Description of Related Art

Without limiting the invention, its background is described in connection with customer support services which are rendered for and after the purchase of a good.

Most makers and vendors, or organizations, of distributed goods provide product support services after the product is purchased. Often a customer is charged a warranty premium, in addition to the purchase price of the good, in order for the customer to partake of the product support services. Such services are oftentimes a deciding factor for the potential customer's purchasing decision. Thus, an organization's capacity for efficient and effective customer and product support may impact its bottom line both in terms of sales, repeat business and/or patronage, and in maintaining effective customer support for a purchased product.

In a typical scenario, customer support requires that the organization expend both time and resources to maintain accessible updated product and customer information. Likewise, the consumer is often asked to remember product types and model numbers, date of sale, customer location and other information relating to a particular sales transaction. In short, providing effective customer support is often a tedious and time consuming process to both customer and organization.

Prior art systems and methods for vending and delivering customer service and support depend primarily on having the customer call into a product and/or customer care center or call center. Typically, a customer is asked to register a product with the organization and/or call center after the product purchase in order to receive support. Likewise, the customer is generally asked to repeat all the registration and product information upon future access to support. The integration of customer service calls with appropriate call centers has no theretofore been addressed in prior art systems. In addition, the process of manually or automatically routing customer service calls, based on product type and model and/or customer identification, to a correct one of many call centers, is not practiced by prior art systems.

A need therefore exists for a system and method wherein a customer can call into a single network and be speedily and automatically connected with a product specialist, or agent, without the customer having to remember an abundance of product related information. Likewise, resource expenditure by the vendor should be kept to a minimum. To this end, an universal application to maintain an information database used for integration of services with the product registration and delivery of customer support services would provide tremendous benefits to organizations and customers alike. Customers could acquire a credit/debit card, or support card, with the purchased product allowing the customer to obtain product and/or customer support from the organization, via call centers, while providing a revenue stream back to the call center and/or organization. By the use of a support card, the customer, now realizing the cost of customer service will forego unnecessary calls thereby freeing up call center resources to more quickly serve other callers and/or matters. In addition, the call center recoups a portion of the proceeds of the sale of such cards thereby generating a revenue stream that can be funneled back into the call center enhancing the same.

BRIEF SUMMARY OF THE INVENTION

The present invention provides a system and method for permitting organizations and customers controlled access to call centers through an automated intelligent interactive voice response application within a switched network. The present invention can be utilized to collect warranty and product registration, measure entitlement, and collect and process information. In one embodiment, the present invention provides a vehicle for organizations to charge and receive revenue for their support services, which traditionally have been solely an expense.

An advantage of the present invention is that it supports a network-based applications that gives an organization the opportunity to improve the quantity and efficiency of services for merchandise purchased by the customer. In this regard, a network-based database provides access to information through applications responsible for maintaining and supporting this database. The database provides controlled access to call centers and for a specific product brand and/or model and/or customer identification.

Another advantage of the present invention is an automated interactive voice application used to acquire information, based on a set of predefined instructions, for a network based database, so that consumers of purchased goods can receive personalized support.

Another advantage of the present invention is at least one customer transaction database for storing a plurality of product, vendor and customer data. The customer transaction database is communicably linked to a customer support network via a first communications link. The database provides effective and timely information sharing.

Another advantage of the present invention is a support card platform. The platform is arranged within to process calls routed through a network by determining the appropriate care center for a particular customer and routing the call accordingly. The transaction processor works automatically, thereby shortening the connecting time between customer and customer support specialist.

Disclosed, in one embodiment, is a telecommunications network based system for accepting customer calls for product-related services and directing these calls to an appropriate call center. The system contains a customer support network and a customer transaction database for storing a plurality of product, vendor, and customer information including call routing data. The customer transaction database can be communicably linked to a customer support network via a first communications link. A transaction processor is arranged to process calls routed through the network. The transaction processor determines the appropriate care center for a particular customer based on the customer's identification. The customer (and the product purchased thereby) is identified by a customer personal identification number provided to the customer with a support card. The customer identification number along with an access telephone number may be provided to the customer at the time of product purchase or may be acquired by the customer in a separate transaction from the purchase of the product.

These and other advantages of the invention will be understood by reference to the following detailed description taken in conjunction with the attached drawings.

BRIEF DESCRIPTION OF THE DRAWINGS

The present invention is described in detail below with reference to the following drawing figures, wherein.

DETAILED DESCRIPTION OF THE PREFERRED EMBODIMENTS

While the making and using of various embodiments of the present invention are discussed in detail below, it should be appreciated that the present invention provides many applicable invention concepts, which can be embodied in a wide variety of specific contexts. The specific embodiments discussed herein are merely illustrative of specific ways to make and use the invention, and do not limit the scope of the invention.

Figure 1A:
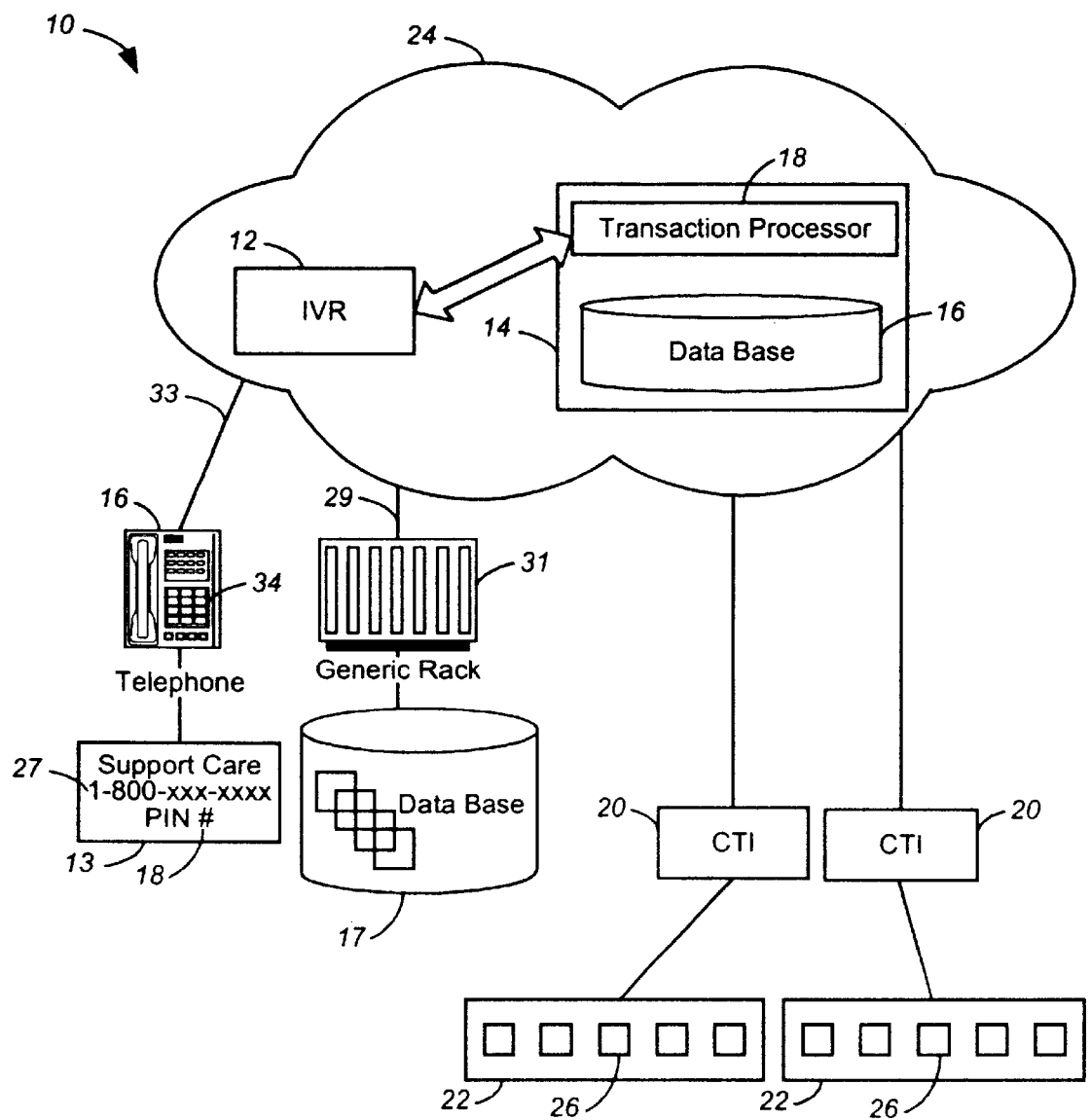
FIG. 1A is a high level block diagram illustrating a system for providing customer product support services according to one embodiment of the present invention.

FIG. 1A depicts a high level block diagram of a system, according to one embodiment of the invention, for providing customer and/or product support services. The present system is generally denoted as 10. In the present system a network 24 based support card platform 14 is set out highlighting with an interactive voice response application (IVR) 12. The platform 14 includes a transaction processor 18 in communication with a transaction database 16. Database 16 includes retrievable information related to customer, vendor, product data and routing information to various call centers. The IVR 12 provides a voice interactive gateway between an incoming caller and call centers platforms 22. Platform 22 support a plurality of individual customer and product support services and/or agents 26, each of which are geared to receive and accommodate an incoming call. Platforms 22 are connected to network 24 via Computer Telephone Integration (CTI) 20. CTI is used to manage resources and to route customer calls and customer and product data to an available agent 26.

Customers are provided with support cards 13. Support cards 13 may be credit/debit type identification cards having an access number 27 and a personal identification number (PIN) 19 imprinted thereon. In addition, the card may be any medium envisioned by the skilled artisan to convey access numbers and PINs to customers. The support cards may be included with the purchase of a product or acquired by the customer in a separate transaction from the product. The PIN 19 may be used, as is further set out below, to identify the customer and/or product purchased by the customer. A single PIN may be assigned to one or a plurality of products and/or customers. Herein, the present invention will be set out in an embodiment wherein a PIN is associated with a single customer and single product In addition to identifying the customer and/or product, the PIN may also used to identify a card expiration date and/or incident count associated with the support card (discussed in further detail below). Briefly, the incident count indicates the number of times a customer identified by the PIN has accessed or otherwise made satisfactory use of the system. The expiration date and/or incident number of a support card may be: renewable; extended; arbitrarily set by the card vendor; set according to a price; or any other business scheme envisioned by the skilled artisan. Both the expiration date and incident count are means by which customers can be tracked, monitored, controlled, and (financially) charged. Data can be generated based on the aforementioned for administrative and other business purposes.

Access to the present system necessitates customer use of telecommunications means. Such means may include: telephones, modem equipped computers; and any other device envisioned by the skilled artisan to effect remote exchange of information. In another embodiment, the customer may present the support card, or information thereon, to a customer and product support provider in person. Herein, the present invention will be set out wherein a telephone is used by the customer to gain access to the customer and product support provider. Herein, telephone 15 is used to indicate the customer. Telephone 15 is in telecommunications connection with network 24, as indicated by line 33.

The present system further includes a second customer database 17 connected, via a generic rack 31, to IVR 12. Database 17 includes customer and/or product data, PIN, expiration, and incident count stored therein. Particular data is not limited to a particular database, nor is the present invention limited by the number of databases cited above. Data allocation and number of databases is limited only by the ordinary skill in the skilled artisan. The function of each of the above cited elements will be set out below in a discussion of the operation of the present invention.

System 10 uses a network 24 based transaction database 16 for storing a plurality of organization and customer account data. The data may vary but in general includes warranty and product registration information, service entitlement information and service processing and history information. Support cards 13 are made available to customers of participating organizations, which allow customers to obtain support cards for purchased goods.

In one contemplated use, a customer receives a support card 13 and calls a toll free number 27 imprinted on the support card 13 to obtain support. A call, originating for example from telephone 15, is routed along line 33 to an Interactive Voice Response (IVR) application 12 for initial processing. The details of how the call is routed is discussed below with respect to FIG. 1B. The IVR application 12 acts as a gateway for the calls and receives routing instructions from a second database 17. Second database 17 may store servers, customers, organizations and/or entitlements information. The IVR application 12 has the ability to interact with first database 16 in network 24 as well as second database 17 through a host connect application. The IVR application 12 allows organizations to change IVR recorded messages from a remote location. In one embodiment, the IVR application 12 is programmed to handle a plurality of organizations at the same time providing a cost-effective solution to multiple customer service calls.

Once a call is received by the IVR application 12, a customer represented by telephone 15, is asked to enter a Personal Identification Number ("PIN") 19 through use of touch tone frequencies per the telephone keypad 34 or other interactive means envisioned by the skilled artisan. The PIN is used to identify the individual customer via a customer account. The account will include such customer information as product type, previous service provided, limitations on service (discussed below), and other information envisioned by the skilled artisan to facilitate quick and efficient routing of the customer to the appropriate agent and delivery of effective customer and/or product support. In addition, the PIN facilitates tracking of the number and/or time of calls made by the customer 15 as well as the type of service provided to the customer. Accordingly, the support card 13 can be sold and serialized, bar coded, imprinted and/or sealed with the telephone access number and/or PIN during a card product manufacture. Various printing techniques can be used for this purpose as envisioned by the skilled artisan.

Once the caller is identified, platform 14, comprising first database 16 and transaction processor 18, queries the customer 15 (through the IVR) to determine the category and/or level of service required by the customer. The customer account is verified and authorized and the call is routed to the appropriate call center agent 26 via Computer Telephone Integration (CTI) 20. CTI retains customer and product information and facilitates routing of same with the telephone call to the appropriate call center agent 26. The first database 16 can be accessible via network 24 or maintained locally on the vendor's premises. In addition, the second database 17 is updated to include information regarding the caller, action taken, resolution and any other relevant information. Finally, in a second embodiment, the CTI need not be used.

The transaction processor 18 and first database 16 may be configured to provide several functions to the IVR application 12. Examples of such functions include, but are not limited to, PIN code verification, call routing based on PIN, customer reporting, and remote access to modify PIN account information of customers from customer workstations.

Limitations may be put on a customer's entitlements per the customer account. A customer's technical support entitlement may be provided in multiple ways: first, a caller 15 may be allowed to place a limited amount of technical support calls or incidents. Accordingly, a maximum or minimum required limit may be placed both on the number of incidents and/or the time period in which these incidents must be used (e.g., a card may be valid for one year from date of purchase or for 90 days from the date of first use). The second type of entitlement is unlimited calls within a specified period of time. In this case, the support card 13 would contain a label with a preassigned call center support number and PIN which are presented to the customer at the time of purchase. In one embodiment, the telephone number provided on support card 13 will enable customers to access any one of the customer support centers 22, as appropriate, and to receive a predetermined number of calls to customer support free of charge. Once the allotted number of calls is completed, the caller 15 may be given the option to obtain additional service for a predetermined fee, which may be charged to a credit card, or billed directly by the organization. In this way, the application can be used to control telephone access to support services, such as third party technical support. In one embodiment, the support centers 22 are able to access the data in second database 17, through the IVR application 12. The support centers 22 may be configured to confirm entitlement, update second database 17, and issue credits.

Caller incidents are processed for validity until their expiration date. Preferably, the expiration date is assigned when card 13 is created; the expiration date is preferably set to a predetermined length of time from the creation date of the card. An expiration period can be determined by a network based software application, which is based on specific vendor preferences.

In use, shrink wrapped packages can be sold through a valve added reseller's (VAR) network. If a caller 15 has used up their prepaid support card calling credits, for example incidents of usage, the application can be configured to play a message instructing the caller 15 to contact their help desk or VAR to purchase additional units, incidents of usage, and/or an additional support card.

Figure 1B:
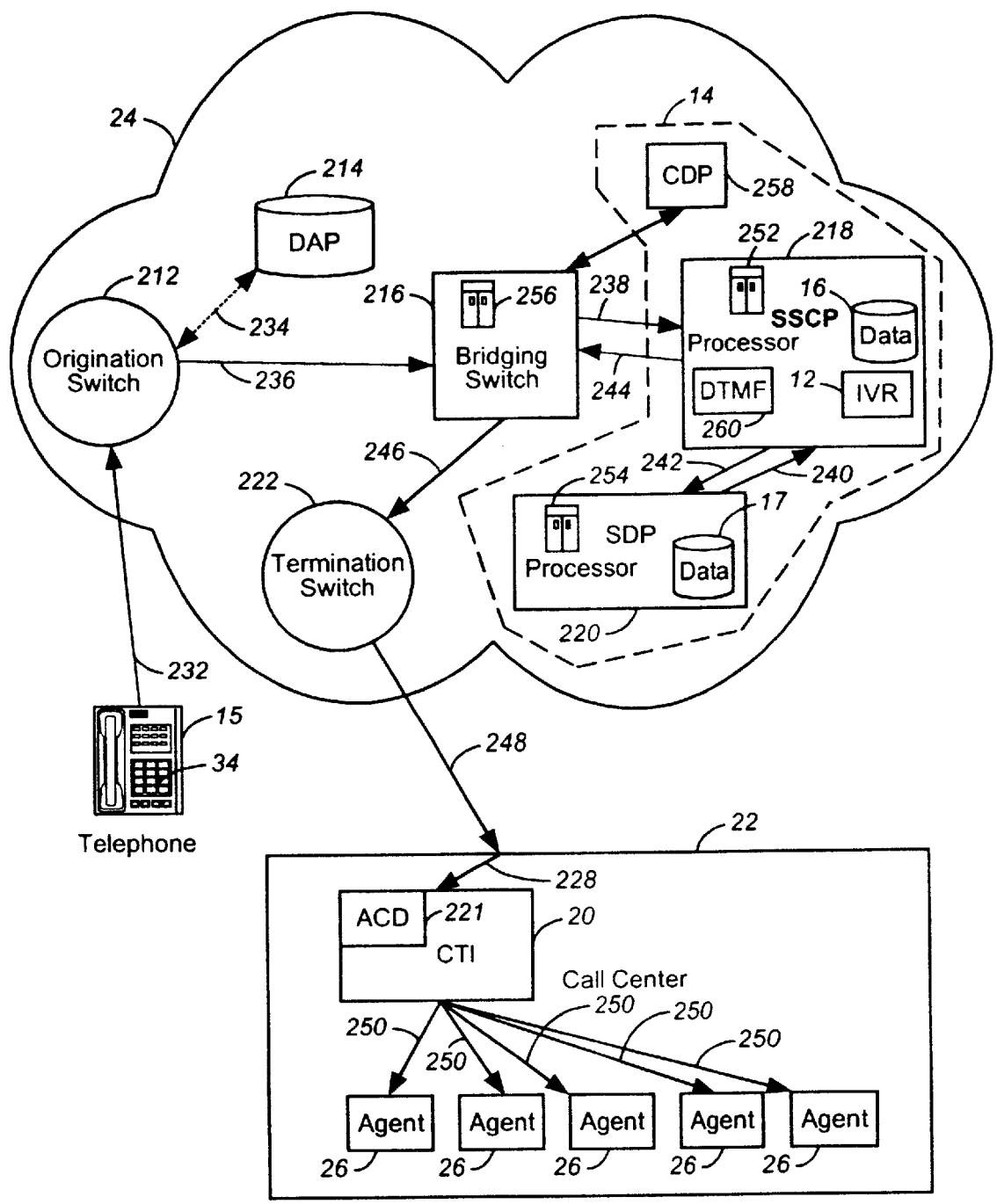
FIG. 1B is a block diagram illustrating a system for providing customer product support services according to one embodiment of the present invention.

FIG. 1B details the connection between incoming telephone calls and appropriate call centers through a block diagram of the present invention. An incoming call, made by a customer using telephone 15, and dialing access number 27 (FIG. 1A), travels along line 232 and is received at origination switch (OSW) 212. Examples of known originating switches include, NORTEL DMS 250 and ALCATEL DEX 600E. Switch 212, upon receipt of the incoming call queries an internal routing platform (DAP) 214 as depicted by line 234. The DAP includes a database and processor (not shown) for storing network call routing data. In response to the query from switch 212, the DAP provides network routing information for network 24 such that switch 12 can route the incoming telephone call to central bridge switch 216 as depicted by line 236. In response to routing instructions from the DAP, the call is routed to central bridge switch 216.

Switch 216 is A switch, examples of which include those listed above. Switch 216 acts as a gateway to platform 14 and IVR 12 of FIG. 1. As depicted, platform 14, includes a switching service control point (SSCP) 218 and service data point (SDP) 230. Upon receipt of the incoming call, switch 216 routes the call to a switching service control point (SSCP) 218 as shown by line 238.

The SSCP 218 is an intelligent switch and service control point which facilitates audio communication and call processing with the customer over the incoming telephone call. The SSCP includes: a SSCP database 264 for storing voice prompts and customer and product data; IVR 12 for the generation of select voice prompts and queries to the customer; a dual tone multi-frequency detection element 260 for detection of DTMF signals over the incoming telephone call; and processor 252 for facilitating the aforementioned and following operations. The prompts and queries are intended to prompt the customer to enter his/her PIN 19 via telephone keypad as discussed above. Upon obtaining the PIN, the SSCP queries SSCP database 264 for identification of the customer and/or product associated with the PIN based on matching the PIN with accounts and data lists stored within the database. The SSCP also determines authorization for customer usage based on credits, expiration dates, and/or incidents number as discussed above. It is noted that SSCP database can be maintained externally from the network and remotely accessed by the SSCP. An example of this arrangement is depicted in FIG. 1A (see element 17). The steps taking by the SSCP to obtain the PIN and other information from the customer are detailed below.

Upon identification and authorization of the customer, the SSCP queries a service data point (SDP) 220 for routing information and related data as depicted by line 242.

The SDP is a service data point control point including: a SDP database 17 (see FIG. 1B) and processor 254. Database 17 maintains, among other information, a store of routing instruction for customer incoming telephone calls, such that the calls can be routed to a select call center agents 26 for serving the particular product and/or customer associated with the PIN. The SDP provides the routing instructions to the SSCP, as depicted by line 240. Upon receipt of routing instruction the SSCP instructs switch 216 to route the incoming telephone call, along with customer and product identifying information supplied by the SSCP and SDP, as depicted by line 244.

Switch 216 routes the incoming telephone call and identifying information to the appropriate intelligent terminating switch 222, as depicted by line 246, such that the incoming call can be subsequently routed, by switch 222 to the appropriate call center 22 (see FIG. 1A) as depicted by line 248.

CTI 20 may be resident outside call center 22 (FIG. 1A) or within call center 22 (FIG. 1B). CTI includes an automatic call distribution PBX (ACD) 221 for receiving the call from the terminating switch (line 248), via line 228, and for placing the customer on hold while searching for a free agent to receive the call. While the customer is on hold, the ACD may play music, advertisements and the like. Alternatively, the ACD may route the customer directly to an agent 26 if the agent is free. In essence, the ACD manages the agents workload by determining availability and forwarding contemporaneously customer calls and customer and product information to the agent. The forwarding of the call to the agent is depicted as line 250.

After the agent if finished servicing the customer, the agent disconnects the telephone call. The disconnection in turn prompts the above routing steps to be executed in reverse such that the each of the above network elements, in reverse order, disconnects or disengages the telephone call, a procedure known in the art for terminating telephone calls in a switched network. The call control returns to the SSCP where the call termination is halted so the caller can access different functions associated herewith.

An additional network element in communication with switch 216 is a call detail platform (CDP) 258. The CDP comprises a database for storing network usage data therein that may be used to generate bills and track network resource usage and traffic.

Figure 2:
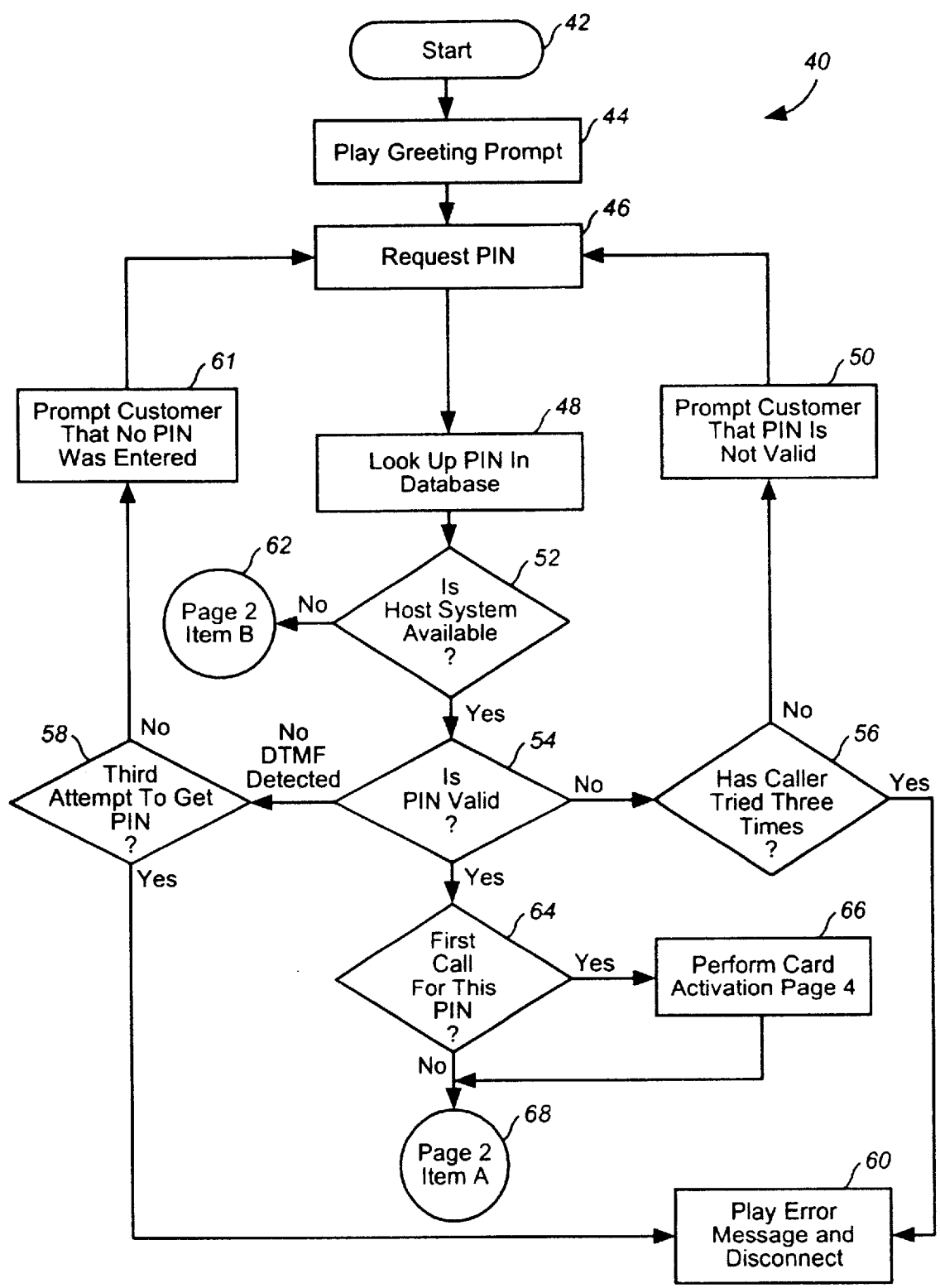
FIG. 2 is a process flow diagram for primary call software for one embodiment of the present invention.

Turning to FIG. 2, a process flow diagram for the support card application is shown and denoted generally as 40. The process 40 is detailed and described herein presuming a network based database 16 (FIG. 1A) is used, although it should be understood that process 40 may be implemented on a more local level to distributed network 24. Primary call software set out by the process flow diagram begins with step 42. In practice, the support cardholder places a call to the IVR application 12 (FIG. 1A) and the system plays a greeting 44 to prompt an action by the customer. The action may be a response to the request for entry of a PIN (step 46). The PIN (19, FIG. 1A) is located on the customers support card (13, FIG. 1A). The system then proceeds to determine if the PIN entered by the customer matches PIN data stored in database 16 (FIG. 1A) (step 48). The system then sends the PIN to a database of a host system to determine if the host system is accessible (step 52). If the support card system receives a response, the response is evaluated to determine whether the PIN is valid or not (step 54). If the PIN is not valid, the system plays a prompt to the customer (step 50). The prompt tells the customer that the entered PIN is not valid. The customer is provided the opportunity to return to step 46 a predetermined number of times (e.g. three, step 56). After the predetermined number of attempts is reached an error message is generated as well as played to the customer and the system disconnects (step 60). In step 58, if no PIN is entered the system will wait a predetermined amount of time and then play a message (step 61) telling the customer that the PIN was not entered. The system will then return to step 46 to request the customer's PIN. The system will request the PIN 19 a predetermined number of times before an error message is prompted causing the system to disconnect (step 60).

If the PIN has expired, the system plays a message telling the customer that the PIN number has expired. The cardholder is further instructed to call a location for purchase or credit renewal of the card. The system then disconnects the customer. An expiration date can be assigned to each PIN as the PIN is created. The date can be 18 months from the creation date, for example, or some other preferred period of time. In one embodiment, the first time a PIN is used, the system will require that the caller to perform an activation routine, which can determine an expiration date. The system can take the current system date and add 12 months or some other period to create an expiration date. If the new date is sooner than the original expiration date, then the new date is made to replace the expiration date. If the new date is later than the expiration date, then the original expiration date can be retained.

If the PIN is valid, step 54 is directed to step 64 wherein the application determines if the support customer has previously accessed the system. If the customer is entering the system for the first time an initial activation routine is performed at step 66. If this is not the customer's first entry the process proceeds to step 68.

Figure 3:
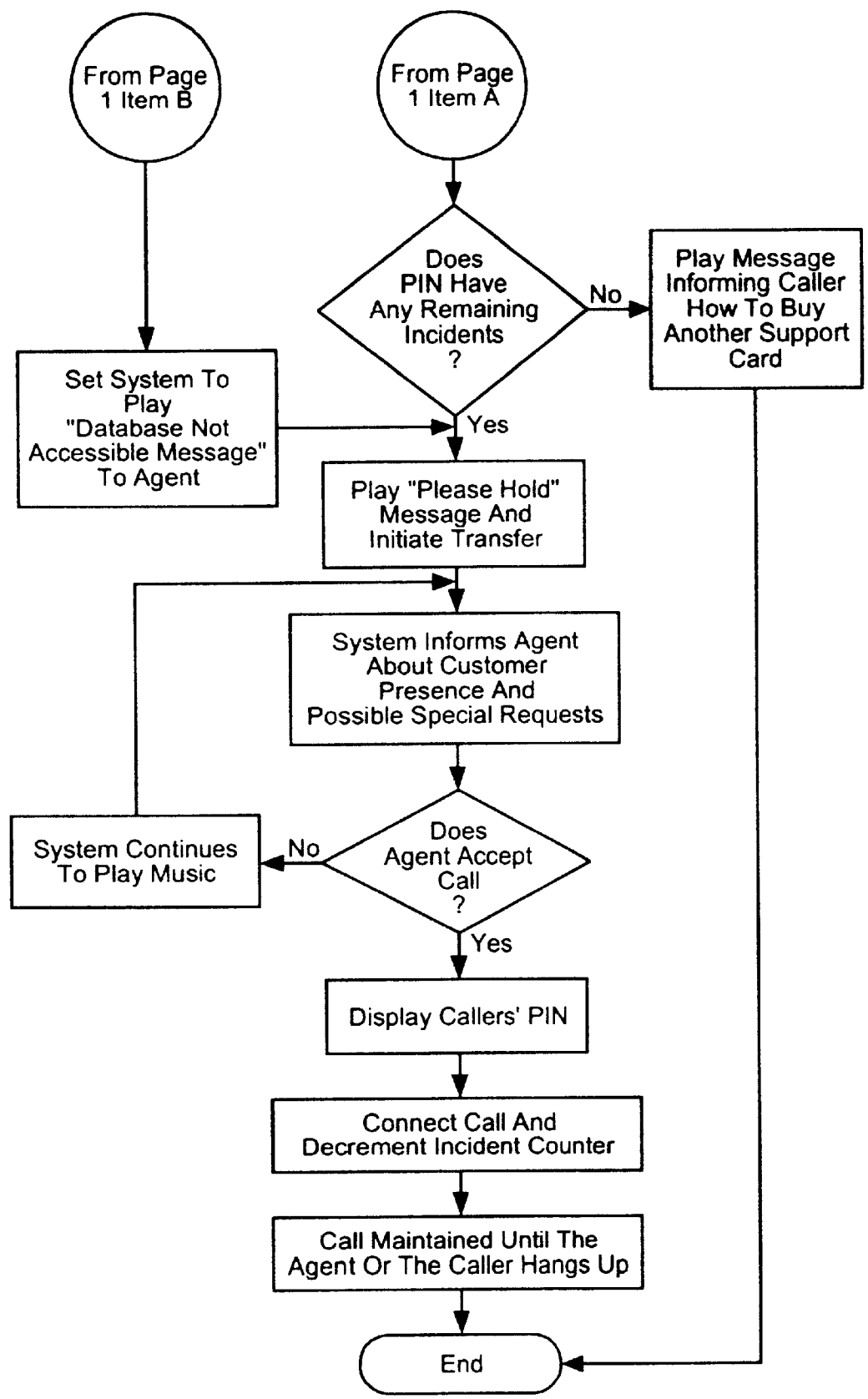
FIG. 3 is a process flow diagram of a process used to initiate manual responses from a database.

Turning to FIG. 3, a flow diagram in the process used to initiate manual responses from the second database 17 is shown and denoted generally as 70. Process 70 begins with step 68 which is preferably invoked by a software routine that is activated after step 68 (see FIG. 2). Thereafter, process 70 proceeds to step 71 wherein the remaining number of allowed incidents are determined for the PIN holder of the support card. If no incidents remain, the support cardholder is prompted with a message instructing the support cardholder to purchase another support card (step 73). The system will then disconnect (step 90).

If the support cardholder has remaining incidents, the process proceeds to step 74. As shown in FIG. 2 and step 52, incoming calls to the call center 22 can fall back to a manual process if the host database system 17 is unavailable (step 62, FIG. 2 and 3). This feature is supported at step 72 wherein the system is set to play a message instructing the customer that the database is inaccessible. In step 74, a new message is played instructing cardholders to "please hold". Next, in step 76, the system can be configured to play music for the cardholder until a support card technician accepts the call at step 78. If so configured, the system continues to play music (step 80) until a support card technician accepts the call (step 78).

Once the support card technician receives the line, the cardholders PIN is displayed to the technician (step 82). Support card technicians will be expected to manually capture the caller's PIN number and support supervisors will decrement each PIN's incident count (step 86) when access to the database system is restored. The call between technician and customer is maintained until either party hangs up (step 88). Once a party disconnects, the process terminates (step 90). Agents will be notified if a PIN code has not been debited, the system will play a prompt indicating preexisting PIN codes for debiting purposes. The system will play a prompt indicating preexisting PIN codes for debiting purposes.

If the database is unavailable for a prolonged period of time a large number of PINs may require debiting. In this case, an ASCII text file of PINs will be accepted with one PIN per record. These PINs will be processed against the database and decremented one incident against each PIN in the file. If a PIN requires multiple incidents to be debited, then it must appear in the file multiple times. In one embodiment, a customer supplied batch number is associated with each run of created PIN numbers. The batch number can be a maximum of eight ASCII characters. The batch number can be inserted into each log record created for a PIN number.

Figure 4:
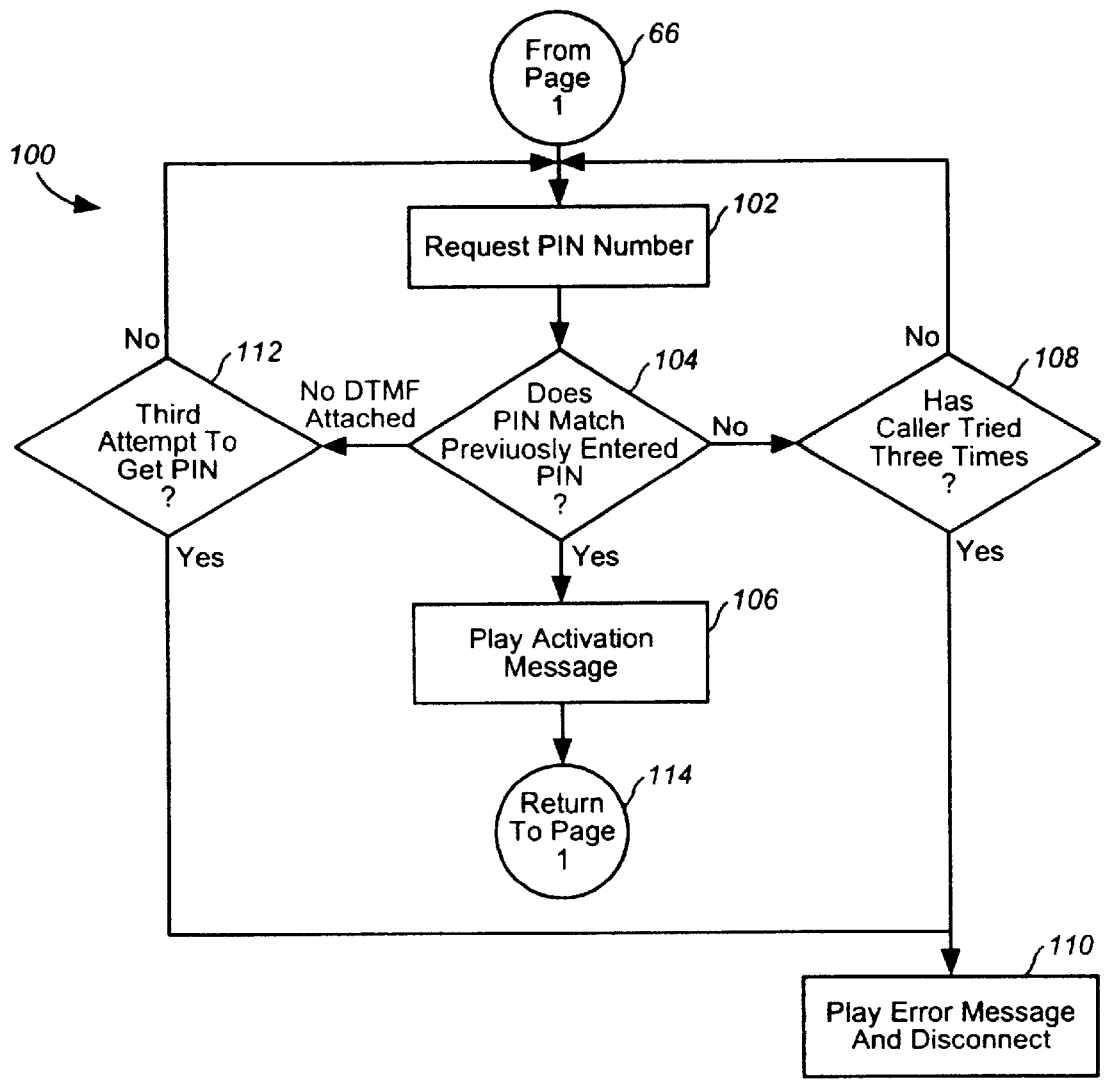
FIG. 4 is a process flow diagram of a software activation routine for one embodiment of the present invention.

FIG. 4 illustrates the software activation routine 100 of the present invention, according to one embodiment. As shown in FIG. 2, if this is the first call for PIN entry, the activation routine is performed at step 66 of FIG. 2 and FIG. 4. This process is continued when the system requests that the cardholder reenter the PIN (step 102, FIG. 4) by prompting the cardholder to reenter the PIN code (19, FIG. 1A). The system will compare the PINs to make sure that the customer entered their PINs correctly (step 104). If the PINs match, the system will play a message thanking and informing the customer that the support card has been activated (step 106). The activation routine then returns to step 66 of FIG. 2 via step 114 of FIG. 4. In one embodiment, the caller will have three attempts to enter the PIN number (step 108) before the system plays an error message and disconnects (step 110). If the caller does not attempt to enter a PIN (step 112) the system will request PIN entry up to three times. After the third request, the system will play an error message and disconnect the customer as indicated (step 110).

Figure 5:
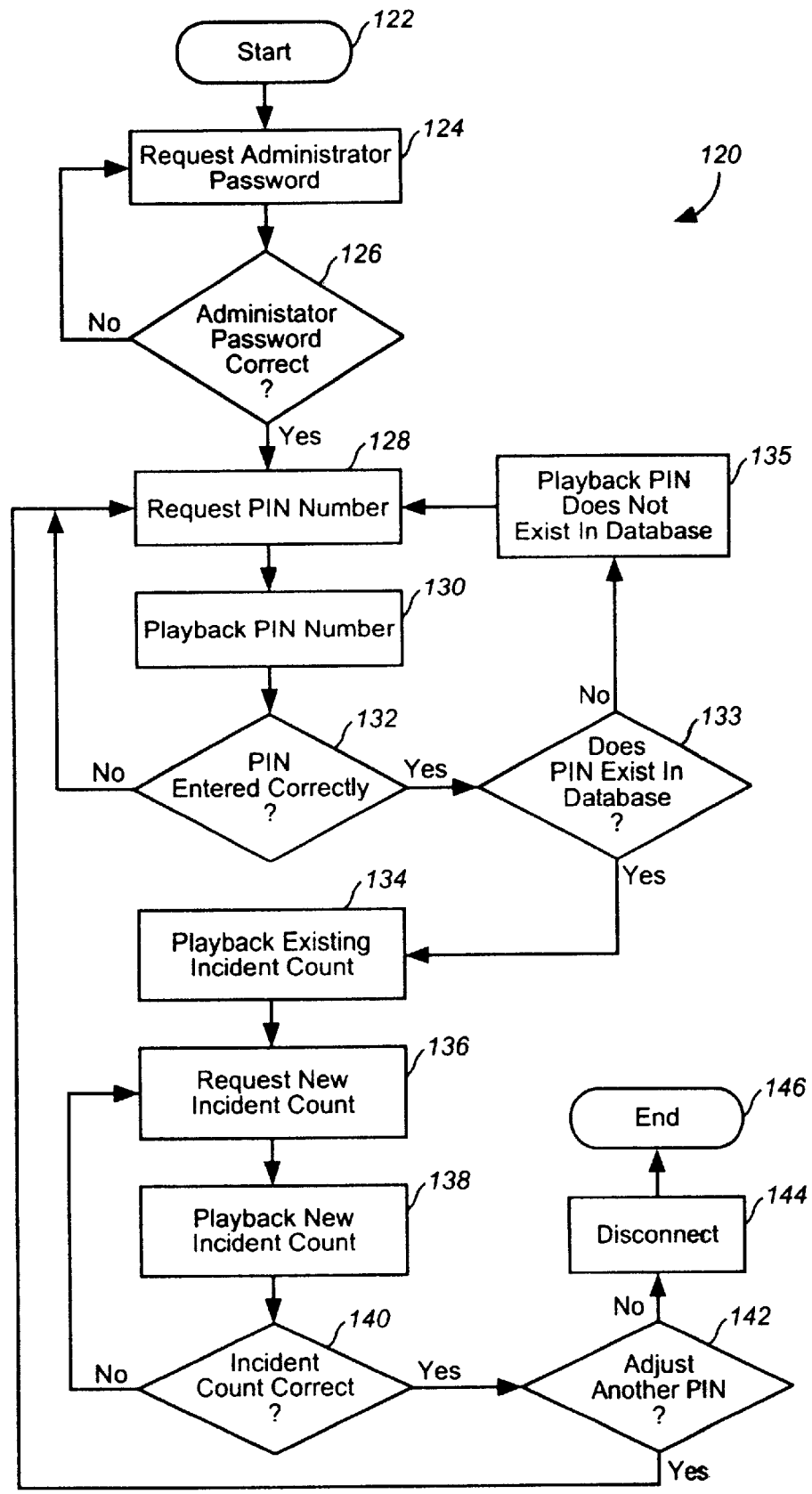
FIG. 5 is a process flow diagram for an administration routine for one embodiment of the present invention.

FIG. 5 is a process flow diagram for the administration routine of the support card application denoted generally as 120. Preferably, the system provides a mechanism for authorized personnel to adjust the available incident count of any PIN. Since the volume of manual adjustments is expected to be low, a password voice application routine may be involved to perform these adjustments thereby avoiding the fixed, ongoing costs associated with direct connections to the application database 16. The use of a voice application routine will also avoid security concerns associated with dial-up modem access to production VRUs. However, this process flow is not limited to telephone interaction and could be expanded to other telecommunications means, as envisioned by the skilled artisan, including computer interaction.

In one embodiment, all adjustments to the PIN (19, FIG. 1) incident counts are logged to a file for reference. Adjusting a PIN's incident count is initiated, at step 122 of FIG. 5. Herein an authorized representative dials a credit/debit routine's number provided for the support card 13, FIG. 1. The systems will request the administrator's password as indicated by step 124. Next, the system verifies the password at step 126 and if the password is correct, process 120 proceeds to step 128. If the authorized representatives provided password is incorrect, the process returns to step 124, wherein the administration password is requested. In one embodiment, after two invalid attempts, the system disconnects.

If the administration password is correct, process 120 proceeds to step 128 wherein the customer PIN is requested.

The system then prompts the authorized representative with the customer PIN number just entered in step 130. The authorized representative is then prompted to validate that the supplied PIN was entered correctly (step 132). If the authorized administrator responds that the PIN was not entered correctly the process returns to step 128. On the other hand, if the supplied PIN was entered correctly the process proceeds to step 133. The system then checks to see if the PIN exists in the database. If the PIN exists, the process continues to step 134. If the PIN does not exist, the administrator is so prompted (step 135) and the process returns to step 128 wherein the administrator is prompted to enter the customer PIN number. After a predetermined number of erroneous entries, the system disconnects (not shown). At step 134, a prompt is played back to the authorized representative informing him/her of the existing incident count availability corresponding to specified PIN.

In one embodiment, the system plays the following when informing the authorized representative of existing incident count:

"The PIN currently has <plays incident count> of incidents remaining. Please enter the new incident count. Remember that this is the total number of incidents remaining after this adjustment. When finished press the pound key. If you do not wish to adjust the incidents, press only the pound key"

The authorized representative is prompted to request a new incident count at step 136. Preferably, the representative can selectively enter a count in the range of 0 to 999. In step 138 the system confirms the new incident count. The system may play a message indicating the new incident count in step 138. The system then prompts the representative to indicate whether the new incident count is correct (step 140). If the authorized representative indicates that new incident count is correct the process continues to decision step 142. If the representative indicates the new incident count is incorrect, the process returns to step 136 and repeats step 136–140.

Once the PIN incident count is entered correctly (per step 140) the system prompts the authorized representative as to whether or not another PIN number is to be adjusted (step 142). If the authorized representative indicates a desire to adjust another PIN then the system returns to step 128 and requests a new PIN count. If the authorized representative indicates he/she does not want to adjust another PIN the system plays a message instructing the representative that the process is over and the system disconnects (step 144). The process then ends (step 146).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is, therefore, intended that the appended claims encompass any such modifications of embodiments.

What is claimed is:

1. A system for receiving customer telephone calls for product and customer related services and routing the calls to pre-selected customer care centers, said system comprising in combination:

a customer support card for displaying an access telephone number and a personal identification number (PIN), said support card associated with said product; and a switched network, for receiving at least one telephone call placed by dialing said access telephone number, said network further comprising at least one database for storing customer and product information therein, and said network facilitating the routing of said telephone call based on said customer and product information to at least one of said pre-selected customer care centers.

2. The system according to claim 1, further comprising a call center in telecommunication with said switched network, said call center providing said customer and product support services, and said call center receiving said routed telephone call.

3. The system according to claim 1, wherein said network further comprises a central intelligent bridge switch for electronically connecting a plurality of network elements and said at least one databases, and said bridge switch facilitating routing of said telephone call to a call center, said call center providing said customer and product support services.

4. The system according to claim 3, wherein said plurality of network elements further comprise:

an originating switch (OSW) positioned within said network for initially receiving said telephone call after said telephone call is made by said customer and selective routing said telephone call to other network elements;

an internal routing platform (DAP) comprising a DAP database for storing network call routing data therein, said DAP positioned within said network so as to facilitate transmission of select network routing data with said OSW so as to further facilitate said selective routing;

a switching service control point (SSCP) for facilitating voice interaction and receipt of information from said customer via said telephone call and generating queries for information, said SSCP positioned within said network so as to receive said routed telephone call, generate said queries to said customer via said telephone call, receive said information from said customer and selectively communicate with other network elements;

a service data point (SDP) comprising a SDP database for storing information therein, said SDP positioned within said network so as to facilitate transmission of SDP data stored in said SDP database to said SSCP in response to selective queries from said SSCP;

a call detail platform (CDP) comprising a CDP database for storing CDP data therein, said CDP positioned within said network so as to facilitate gathering of network data related to network traffic and storing said network data in said CDP database; and a terminating switch (TSW) positioned within said network for facilitating routing of said call from said network to said call center.

5. The system according to claim 4, wherein said network is configured such that a telephone call received at said OSW is routed to said bridge switch based on information obtained by said OSW from said DAP, said telephone call is then routed from said bridge switch to said SSCP wherein said customer is queried by said SSCP and routing information is gathered from said SDP based on customer responses to said customer queries, said telephone call is then routed from said SSCP to said TSW based on said routing information; and said telephone call is routed from said TSW to said call center.

6. The system according to claim 4, wherein said SSCP further comprises: a database for storing customer account data and voice prompts data therein; an interactive voice response unit for generating voice prompts to said customer over a telephone connection effected by said telephone call; first means for detecting and interpreting human voice or said dial tone manufactured frequencies generated by said customer over said telephone connection; second means for creating second data based on comparing said detected and interpreted dial tone with said customer account data stored in said database; and third means for routing said call, second data, customer and product information to said SDP.

7. The system according to claim 4, wherein said SDP data stored in said SDP database includes call routing information and customer and product identification.

8. The system according to claim 4, wherein said network data relates to usage time and incident number of customer access to said network.

9. The system according to claim 3, wherein said bridge switch further includes a processor, in electrical communication therewith, said processor providing processing intelligence for said bridge switch.

10. The system according to claim 4, said telephone access number is a toll free number.

11. The system according to claim 1, wherein:

said call center further comprises a computer telephone integration unit for providing customer and product identification to a select operator within said center contemporaneously with routing said telephone call to said operator; and said PIN further identifies an expiration date after which said PIN is no longer accepted by the system.

12. The system according to claim 1, wherein said call center further comprises an automatic call distribution unit for routing calls received by said call center to agents.

13. A method of making a system for providing customer and product support services from a call center, including the steps of:

(a) providing a customer with a telephone access number and a personal identification number (PIN), said telephone access number facilitating remote access to a telecommunications network and said PIN identifying said customer and said product; and (b) programming said network to provide remote access by a customer to said center, said center staffed by agents providing said customer with said support services.

14. The method according to claim 13, wherein said step of providing further includes providing the customer with a support card, said card having said telephone access number and PIN imprinted thereon.

15. The method according to claim 14, wherein said PIN further identifies a number of incidents of accessing said network.

16. The method according to claim 15, wherein said number of incidents is stored in a database in said network; and access to said network is limited to a number of incidents.

17. The method according to claim 16, further comprising the step of providing the customer the option to acquire additional incidents.

18. The method according to claim 17, wherein said center further comprises a computer telephone integration unit for providing customer and product identification to said center while said remote access is being routed to said center.

19. The method according to claim 13, wherein said network further comprises a central intelligent bridge switch connecting an originating switch (OSW), a terminating switch (TSW), a switching service control point (SSCP), a service data point (SDP), a call detail platform (CDP), and an internal routing platform (DAP) for routing a customer telephone call to said center via said network.

20. The method according to claim 19, wherein:
said OSW is positioned within said network for initially receiving said telephone call after said telephone call is made by said customer and selective routing said telephone call to other network elements;
said DAP comprises a DAP database for storing network call routing data therein, said DAP positioned with said network so as to facilitate transmission of select network routing data with said OSW so as to further facilitate said selective routing;
said SSCP facilitating voice interaction and receipt of information from said customer via said telephone call and generating queries for information, said SSCP positioned within said network so as to receive said routed telephone call, generate said queries to said customer via said telephone call, receive said information from said customer and selectively communicate with other network elements, and said SSCP further comprising a database for storing customer account data and voice prompts data therein, an interactive voice response unit for generating voice prompts to said customer over a telephone connection effected by said telephone call, first means for detecting and interpreting said dial tone manufactured frequencies generated by said customer over said telephone connection, second means for comparing said detected and interpreted dial tone with said customer data stored in said database, and third means for routing said call, second data, and customer and product information to said SDP;
said SDP comprising a SDP database for storing information therein, said SDP positioned within said network so as to facilitate transmission of SDP data stored in said SDP database to said SSCP in response to selective queries from said SSCP, and said SDP data stored in said SDP database including call routing information and customer and product identification;
said CDP comprising a CDP database for storing CDP data therein, said CDP positioned within said network so as to facilitate gathering of network data related to network traffic and storing of said network data in said CDP database, and said network data relate to usage time and incident number of customer access to said network;
said TSW positioned within said network for facilitating routing of said call from said network to said call center; and
said network is configured such that said telephone call received at said OSW is routed to said bridge switch based on information obtained by said OSW from said DAP; said telephone call is then routed from said bridge switch to said SSCP wherein said customer is queried by said SSCP and routing information is gathered from said SDP based on customer responses to said customer queries, said telephone call is then routed from said SSCP to said TSW based on said routing information, and said telephone call is routed from said TSW to said call center.

21. The method according to claim 13, wherein said PIN further identifies an expiration date after which said PIN no longer provides identification of said customer and said product.

22. Method according to claim 14, wherein said PIN further identifies an expiration date after which said PIN no longer provides identification of said customer and said product.

23. A system for receiving customer telephone calls for product and customer related services and routing the calls to preselected customer call centers, said system comprising:
a customer support card for displaying an access telephone number and a personal identification number (PIN), said support card associated with said product;
a customer support communication network for receiving and facilitating routing of telephone calls resulting from dialing of said access telephone number;
a transaction processor for processing and routing said telephone calls received by said network, said transaction processor communicably linked to said customer support communication network, said processor identifying appropriate customer call center for said telephone calls received by said network and facilitating the routing of said telephone calls to said appropriate call centers; and
at least one database for storing product, vendor, customer and customer call center data, said database communicably linked to said transaction processor such that said transaction processor queries said database for data when said transaction processor processes and routes said telephone calls.

24. The system according to claim 23, further comprising an interactive voice recognition application (IVR) communicably connected to said customer support communication network and said transaction processor, said IVR receiving and routing said telephone calls to said transaction processor.

25. The system according to claim 24 wherein said IVR further queries a dialer of said access number for and receives entry of said PIN and said queries are routed to said transaction processor for matching against a data list stored a within said at least one database.

26. The system according to claim 25, further comprising a second database, communicably linked to said IVR, said second database receiving and retrievably storing customer information from said IVR, said customer information including customer identification information and PIN.

27. The system according to claim 26, wherein said customer information includes by the IVR, expiration dates for PINs and incidents numbers for customers identified by said PINs.

28. The system according to claim 24, further comprising at least one computer telephone integration (CTI) communicably linked between said network and said customer call center such that said CTI receives information from said network and facilitates communication of said information to said customer call center.

29. The system according to claim 23, wherein said support card is provided to said customer when said customer acquires said product.

30. The system according to claim 23, wherein said support card is made available to said customer in a distinct transaction from said product being made available to said customer.

31. The system according to claim 23, wherein said telephone access number is a dedicated 800 number.

32. The system according to claim 23, wherein said transaction processor is configured to determine the incident number corresponding to a specific customer and said incident number is stored in said first or second database.

33. The system according to claim 32, wherein said transaction processor is configured to reject calls after a predetermined threshold number of incidents has been reached.

34. The system according to claim 33, wherein said transaction processor is configured to reject calls after the number of incidents is exhausted.

35. A method of providing customer support services to a customer having a customer support card by programming and configuring a switched network to perform the following steps:

(a) receiving a call from a customer who has dialed a telephone access number and said telephone access number associated with said support card;

(b) prompting the customer to enter a PIN and said PIN associated with said support card;

(c) detecting and routing said PIN to a transaction processor for said transaction processor determination of validity of said PIN;

(d) determining an appropriate call center for said PIN if said PIN is valid; and (e) routing the call to said call center.

36. The method according to claim 35, further comprising the following step:

(f) providing the customer with a support card, said support card having said telephone access number and said personal identification number (PIN) imprinted on said support card.

37. The method according to claim 35, wherein said transaction processor is communicably linked with a first database containing lists of valid PINs.

38. The method according to claim 35, wherein step (b) further comprises the step of:

(b1) playing a greeting to the customer using an interactive voice response (IVR).

39. The method according to claim 38, wherein step (b) further comprises the steps of:

(b2) using DTMF detection means to determine if a PIN was entered;

(b3) repeating the step of prompting the customer for entry of PIN if no PIN was detected;

(b4) repeating steps (b2)–(b3) up to three times if no PIN was detected; and (b5) playing an error message and disconnecting said call if no DTMF is detected at the third performance of step (b2).

40. The method according to claim 39, wherein step (b) further comprises the steps of:

(b6) using said IVR to playback said entered PIN to said customer;

(b7) prompting said customer to verify said playback PIN matches said entered PIN;

(b8) repeating the step of prompting the caller to enter said PIN, if the caller indicates that said playback PIN does not match said entered PIN;

(b9) repeating steps (b6)–(b8) at least three times if the caller indicates at step (b8) that the playback PIN does not match said entered PIN; and (b10) playing an error message and disconnecting the call if no DTMF is detected at the third performance of step (b6).

41. The method according to claim 35, wherein step (c) further comprises the steps of:

(c1) determining if the caller is a first time caller; and (c2) commencing support card activation if the caller is determined to be a first time caller.

42. The method according to claim 35, wherein further comprising the steps of:

(g) identifying at least one product associated with said customer based on said verified PIN, (h) identifying said customer based on said verified PIN identification; and (i) forwarding the identifications of steps (g) and (h) to said call service center with said call when said call is forwarded to said call service center.

43. The method according to claim 35, further comprising the steps of:

(j) identifying a number of incidents for said customer based on said verified PIN;

(k) routing said call to said call center if said number exceeds a minimum number of incidents for said customer; and (l) routing said call to a support card customer service center agent if said number does not exceed a minimum number of incidents for said customer.

44. The method according to claim 43, further comprising the step of:

(m) displaying said verified PIN to said agent.

45. The method according to claim 43, further comprising the step of:

(n1) decrementing the incident count if the customer is routed to said customer call center.

46. The method according to claim 45, further comprising the steps of:

(n2) decrementing the incident count if said call is handled by a live agent and the customer is satisfied with said customer support services.

47. The method according to claim 43, wherein step (l), further comprises the steps of:

(l1) establishing a connecting between said agent and said transaction processor;

(l2) requesting an administrator password and authenticating said password;

(l3) requesting said PIN;

(l4) authenticating said PIN;

(l5) indicating to said agent the number of incidents remaining for said PIN;

(l6) requesting a new number of incidents for said PIN;

(l7) authenticating said new number of incidents;

(l8) changing said number of incidents remaining to said new number of incidents (l9) requesting another PIN; and (l10) repeating steps (l1) through (l9) if another PIN is entered; and (l11) terminating said connection if another PIN is not entered.

* * * * *